United States Patent [19]

Clower et al.

[11] Patent Number: 5,132,868
[45] Date of Patent: Jul. 21, 1992

[54] OVER-HEATING PROTECTIVE CIRCUIT

[75] Inventors: Penn H. Clower, Andover; Carlo Venditti, Norwood, both of Mass.

[73] Assignee: The United States of America as represented by the Secretary of the Navy, Washington, D.C.

[21] Appl. No.: 704,512

[22] Filed: May 23, 1991

[51] Int. Cl.⁵ .............................................. H02H 5/04
[52] U.S. Cl. ..................................... 361/103; 361/86; 361/90
[58] Field of Search ............... 361/103, 106, 140, 161, 361/86, 56, 90

[56] References Cited

U.S. PATENT DOCUMENTS

| | | | |
|---|---|---|---|
| 4,675,777 | 6/1987 | Watrous | 361/106 |
| 4,733,322 | 3/1988 | Harper et al. | 361/103 |
| 4,750,079 | 6/1988 | Fay et al. | 361/101 |
| 4,866,559 | 9/1989 | Cobb et al. | 361/103 |
| 4,887,181 | 12/1989 | Lenz | 361/103 |
| 5,001,593 | 3/1991 | Zitta et al. | 361/103 |

Primary Examiner—Steven L. Stephan
Assistant Examiner—Matthew Nguyen
Attorney, Agent, or Firm—Robert M. Wohlfarth; John P. Tarlano

[57] ABSTRACT

A protective circuit for protecting electrical equipment. The circuit has a heat sensor for sensing heat from the electrical equipment, an amplifier for amplifying the sensor voltage. The circuit also has a power supply, a heater, and drive transistor for conducting current from the power supply to the heater due to amplified sensor voltage on the drive transistor. The circuit further has a heat sensitive switch that has a switching temperature. The heat sensitive switch is between another power supply, for the electrical equipment, and the electrical equipment. The heat sensitive switch initially conducts electrical power to the electrical equipment. The switch will interrupt electrical power to the electrical equipment, after a selected rate of heat from the electrical equipment activates the circuit to cause the heater to produce a switching heat. This switching heat from the heater raises the temperature of the heat sensitive switch above its switching temperature. Electrical power to the electrical equipment is interrupted. The switch will again conduct electrical power to the electrical equipment after the temperature of the heat sensitive switch decreases below its switching temperature, due to cooling of the electrical equipment and the heater.

3 Claims, 1 Drawing Sheet

OVER-HEATING PROTECTIVE CIRCUIT

FIELD OF THE INVENTION

The present invention relates to an over-heating protective circuit, for protecting electrical equipment from over-heating.

BACKGROUND OF THE INVENTION

Various heat activated switches have been known in the past. One such switch is shown in U.S. Pat. No. 4,329,726. However such a switch has not been used in an over-heating protective circuit for electrical equipment.

Such electrical equipment may normally be cooled by means such as water cooling. Should such cooling means fail or not be initially activated, the disclosed protective circuit will protect the electrical equipment.

SUMMARY OF THE INVENTION

A protective circuit for protecting electrically powered electrical equipment that has a heat rate at which heat is given off comprising first means for providing a voltage gain for a voltage corresponding to the heat rate and a heat sensitive switch responsive to said first means for stopping electrical power from reaching the electrical equipment when the heat rate raises above a selected heat rate.

DESCRIPTION OF THE PREFERRED EMBODIMENT

Figure 1:
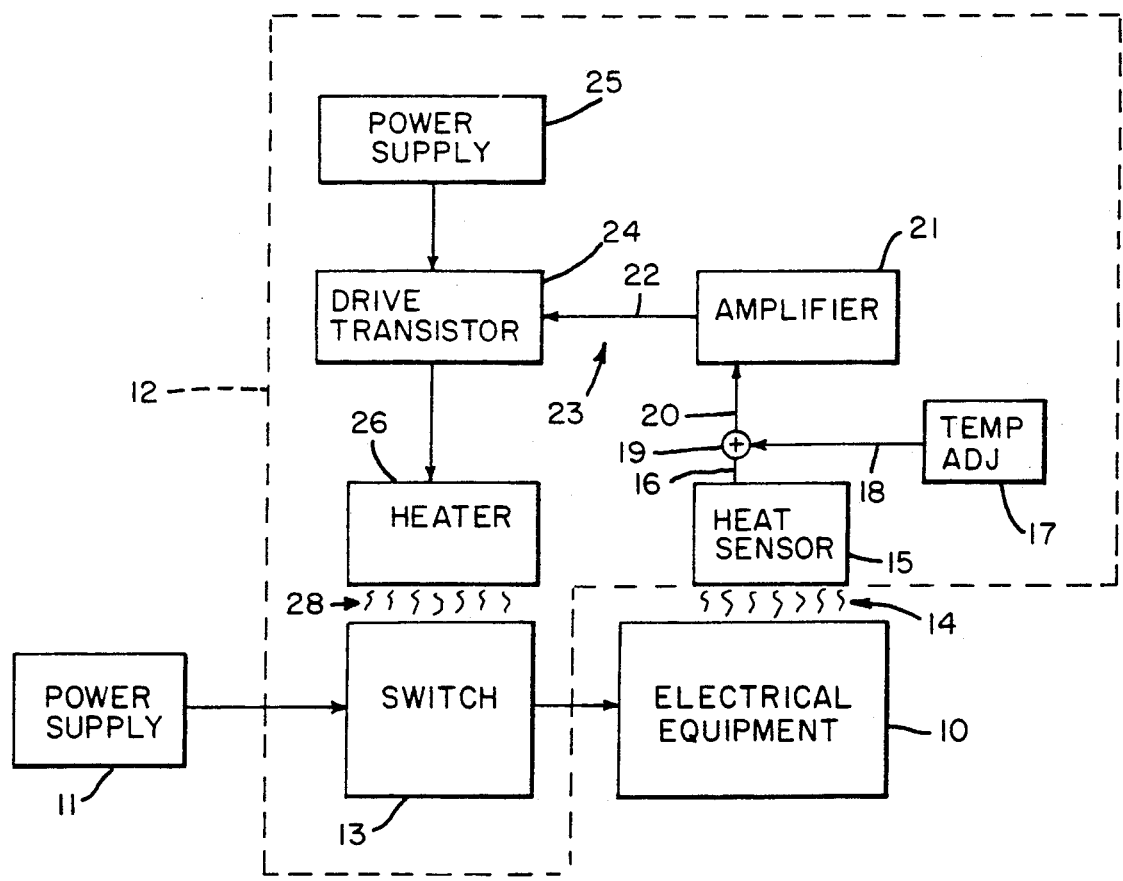
FIG. 1 shows the protective circuit of the present invention.

FIG. 1 shows electrical equipment 10 which is to be protected against over-heating produced by power from power supply 11 by means of protective circuit 12. The electrical equipment 10 is electrically driven by power supply 11, through a heat sensitive switch 13 between the electrical equipment 10 and the power supply 11. The heat sensitive switch 13 will go from a low resistance state to a high resistance state when its temperature is raised above a switching temperature. The heat sensitive switch 13 may be a solid state heat sensitive switch.

One type of solid state heat sensitive switch is manufactured by Raychem Corporation of Menlo Park, Calif., under the Trademark "POLYSWITCH". U.S. Pat. No. 4,329,726 describes this type of solid state heat sensitive switch. The teachings of U.S. Pat. No. 4,329,726 are incorporated herein by reference.

The rate at which heat 14 is given off by electrical equipment 10 is sensed by a heat sensor 15. The heat sensor 15 could be a thermistor. The heat sensor 15 will sense a temperature change of 0.1 degrees Kelvin or more. This temperature raise would be due to an increased rate at which heat 14 is given off of electrical equipment 10. The rate at which heat 14 is given off of electrical equipment 10 is associated with an incrased temperature of electrical equipment 10. A positive sensor voltage output 16, from sensor 15, would be proportional to the rate at which heat 14 is being given off of electrical equipment 10. A variable voltage device 17 is used to cancel some or all of voltage 16. A negative voltage 18 is emitted from variable voltage device 17. The voltage 18 is added with voltage 16 in adder 19. A combined voltage 20 is emitted from adder 19. Amplifier 21 will respond to voltage 20 if it has a positive value, but not if it has a negative value.

The voltage 20, is amplified by a voltage amplifier 21. The amplification factor may be ten or more. The amplified voltage 22, on line 23, is applied to a gate electrode of a drive transistor 24. The drive transistor 24 will provide a relatively large increase in an amount of current passing through it, for a given raise in the amplified voltage 20, which is voltage 22 that is being applied to the gate electrode of transistor 24.

A power supply 25 is connected to a source electrode of drive transistor 24. A heater 26 is connected to the a drain electrode of drive transistor 24.

The drive transistor conducts a amount of current from power supply 25 to heater 26 dependent on the voltage level of voltage 21. The heater 26 will produce a rate of heat 28 dependent on the voltage level of voltage 21.

The heat 28 is applied to switch 13. If the rate of heat 28 from heater 28 is sufficiently high to raise the temperature of switch 28 above the switching temperature of switch 28, the switch 28 will go from a low resistance state to a high resistance state.

The protective circuit 12 of FIG. 1 will protect electrical equipment 10 from over-heating. The switch 13 may be made to go from a low resistance state to a high resistance state for a raise of a tenth of a degree above the normal operating temperature of electrical equipment 10. The gain of the circuit 12 can be varied by selecting the amplification factor of amplifier 21, the response of drive transistor 24, the sensing characteristics of heat sensor 15, and the switching temperature of switch 13.

An operational example of the disclosed over-heating protective circuit is as follows:

Certain electrical equipment 10 normally operates at 30 degrees Centigrade. Equipment 10 emits 15 watts of heat to raise the temperature of both equipment 10 and sensor 15 from room temperature, 28 degrees, to 30 degrees Centigrade. The voltage output 16 of sensor 15 is 0.3 volts at 30 degrees Centigrade. The voltage out raises 0.01 volts per degree between 0 and 200 degrees Centigrade. The voltage output of amplifier 20 is 0 volts until the voltage 16 reaches 1.2 volts. The amount of current through transistor 24 is 0 amps until amplifier 20 turns on. The amount of heat produced by heater 26 is 0 watts until driven by transistor 24. The temperature of switch 13 is 28 degrees Centigrade until activated by heater 26. The switching temperature of switch 13 is 125 degrees Centigrade.

Due to some malfunction, such as a cooling malfunction, the electrical equipment 10 heats up by 120 degrees, from 30 degrees to 150 degrees Centigrade. A corresponding increased amount of heat energy per second (watts) is given off from equipment 10. Nine hundred fifteen watts of heat is given off by the electrical equipment 10, instead of 15 watts of heat. The increased rate of heat increases the output voltage 16 of the sensor 15 to 1.5 volts. The voltage 18 out of device 17 is 1.2 volts. The voltage difference 20 is 0.3 volts. The voltage difference 20 is amplified to 3.0 volts by nonlinear amplifier 21. This amplifier voltage 22, of 3.0 volts, drives the drive transistor 24. The amount of current passing through drive transistor 24, from power supply 25, increases from 0 amps to 30 amps. The heater 26 will increase its heat output from 0 watts to 3000 watts. Switch 13 will begin heating up to a value of 177 degrees Centigrade.

When the temperature of switch 13 reaches 125 degrees Centigrade, in 5 seconds, switch 13 switches from its low resistance state to its high resistance state. For a 30 degree temperature increase of equipment 10, above a threshold value of 120 degrees, the heat rate of heater 26 increases to 3000 watts. This is a 3.28 heat rate gain, 3000 watts divided by 915 watts, due to circuit 12 of FIG. 1.

In the above example switch 13 switches to a high resistance state at 125 degrees Centigrade to interrupt power from power supply 11 to electrical equipment 10. Thus electrical equipment 10 is protected against overheating.

Once the temperature of the heat sensitive switch 13 falls below the switching temperature, after power to the electrical equipment 10 has been removed for a period of time, the switch 13 will return to its low resistance state. The protective circuit 12 of FIG. 1 may be, thereafter, reused.

Again, the specific operating characteristics of the protective circuit 12 will depend on the amount of protection, against over-heating, that one wants to provide to the piece of electrical equipment 10. One would select the amount of a temperature rise that one would want the electrical equipment 10 to be subjected to before action is automatically taken by circuit 12. The designer may select a switching temperature of the switch 13, a output voltage change for temperature change for heat sensor 15 an amplification factor for amplifier 21, current production characteristics for drive transistor 24 and the temperature rise of heater 26, to accommodate a turn-off at a selected switching temperature. Thus the gain of the protective circuit 12, shown in FIG. 1, would be varied depending on amount and speed of protection desire.

While the present invention has been disclosed in connection with the preferred embodiment thereof, it should be understood that there may be other embodiments which fall within the spirit and scope of the invention as defined by the following claims.

What is claimed is:

1. A protective circuit for protecting electrically powered electrical equipment that has a heat rate at which heat is given off, comprising:
   (a) first means for providing a voltage corresponding to the heat rate;
   (b) second means including an amplifier for providing a voltage gain for the voltage corresponding to the heat rate;
   (c) heater means for generating heat that is usable for switching;
   (d) power supply means for supplying power to the heater means;
   (e) third means for controlling power from the power supply means to the heater means under control of the second means; and
   (f) a heat sensitive switch, initially conducting electrical power to the electrical equipment, having a switching temperature, the heat sensitive switch being switched by heat from said heater means for stopping electrical power from reaching the electrical equipment when the heat rate raises above a selected heat rate, and for again conducting electrical power to the electrical equipment after the heat rate decreases below the selected heat rate as a result of a lack of electrical power to the electrical equipment.

2. A protective circuit for protecting electrically powered electrical equipment that has a heat rate at which heat is given off, comprising:
   (a) first means for providing a voltage corresponding to the heat rate;
   (b) second means for providing a voltage gain for the voltage corresponding to the heat rate, said second means including a variable voltage device for determining a voltage at which said second means begins providing a voltage gain;
   (c) heater means for generating heat that is usable for switching;
   (d) power supply means for supplying power to the heater means;
   (e) third means for controlling power from the power supply means to the heater means under control of the second means; and
   (f) a heat sensitive switch, initially conducting electrical power to the electrical equipment, having a switching temperature, the heat sensitive switch being switched by heat from said heater means for stopping electrical power from reaching the electrical equipment when the heat rate raises above a selected heat rate, and for again conducting electrical power to the electrical equipment after the heat rate decreases below the selected heat rate as a result of a lack of electrical power to the electrical equipment.

3. A protective circuit for protecting electrically powered electrical equipment that has a heat rate at which heat is given off, comprising:
   (a) a heat sensor for providing a sensor voltage that is responsive to the heat rate of heat from the electrical equipment to the heat sensor;
   (b) an amplifier for amplifying the sensor voltage;
   (c) a power supply;
   (d) a heater;
   (e) a drive transistor for conducting current from the power supply to the heater due to amplified sensor voltage on the drive transistor; and
   (f) a heat sensitive switch having a switching temperature, for initially conducting electrical power to the electrical equipment, for interrupting electrical power to the electrical equipment after heat from the heater raises the temperature of the heat sensitive switch to a temperature that is above the switching temperature of the heat sensitive switch, and for again conducting electrical power to the electrical equipment after the temperature of the heat sensitive switch decreases below the switching temperature of the heat sensitive switch as a result of a lack of electrical power to the electrical equipment.

* * * * *